US009236663B2

(12) United States Patent
Akhi et al.

(10) Patent No.: US 9,236,663 B2
(45) Date of Patent: Jan. 12, 2016

(54) ELECTRONIC DEVICE HAVING ADAPTIVE FILTER CIRCUITRY FOR BLOCKING INTERFERENCE BETWEEN WIRELESS TRANSCEIVERS

(71) Applicant: Apple Inc., Cupertino, CA (US)

(72) Inventors: Fraidun Akhi, Fremont, CA (US); Ge Liu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 13/849,428

(22) Filed: Mar. 22, 2013

(65) Prior Publication Data

US 2014/0287794 A1 Sep. 25, 2014

(51) Int. Cl.
*H04B 1/04* (2006.01)
*H04B 1/10* (2006.01)
*H01Q 21/00* (2006.01)
*H04B 1/525* (2015.01)

(52) U.S. Cl.
CPC .......... *H01Q 21/0006* (2013.01); *H04B 1/525* (2013.01)

(58) Field of Classification Search
USPC ........ 455/78, 82, 114.1, 114.2, 296, 307, 311
See application file for complete search history.

(56) References Cited

U.S. PATENT DOCUMENTS

| | | | |
|---|---|---|---|
| 5,276,914 A * | 1/1994 | Ishizuka et al. ................ 455/83 |
| 6,256,480 B1 * | 7/2001 | Stengel, Jr. .................... 455/78 |
| 7,676,243 B2 | 3/2010 | Leinonen et al. |
| 8,073,894 B1 * | 12/2011 | Dasgupta et al. ............. 708/819 |
| 8,269,683 B2 | 9/2012 | McKinzie et al. |
| 8,750,809 B2 * | 6/2014 | Bremer et al. .................. 455/78 |
| 2003/0090339 A1 * | 5/2003 | Yu et al. ......................... 333/167 |
| 2004/0048634 A1 * | 3/2004 | Satoh et al. ................ 455/562.1 |
| 2004/0266378 A1 * | 12/2004 | Fukamachi et al. ........ 455/188.1 |
| 2005/0134398 A1 * | 6/2005 | Myong et al. ................ 333/17.1 |
| 2005/0157618 A1 * | 7/2005 | Lee et al. .................... 369/47.27 |
| 2005/0215204 A1 | 9/2005 | Wallace et al. |
| 2006/0281418 A1 * | 12/2006 | Huang et al. ..................... 455/78 |
| 2008/0080455 A1 * | 4/2008 | Rofougaran .................. 370/342 |
| 2008/0211598 A1 * | 9/2008 | Eplett .......................... 333/17.3 |
| 2009/0284220 A1 | 11/2009 | Toncich et al. |
| 2010/0091752 A1 * | 4/2010 | Kemmochi et al. ........... 370/339 |
| 2010/0233975 A1 * | 9/2010 | Wu et al. .................... 455/115.1 |
| 2012/0009887 A1 * | 1/2012 | Sanguinetti et al. ............ 455/78 |
| 2012/0302188 A1 * | 11/2012 | Sahota et al. ............. 455/150.1 |
| 2013/0021113 A1 * | 1/2013 | Bakalski et al. .............. 333/176 |

FOREIGN PATENT DOCUMENTS

WO 2007099413 9/2007

* cited by examiner

*Primary Examiner* — Nguyen Vo
(74) *Attorney, Agent, or Firm* — Treyz Law Group, P.C.; G. Victor Treyz; Michael H. Lyons (57) ABSTRACT

An electronic device may include radio-frequency transceiver circuitry and antenna structures. The radio-frequency transceiver circuitry may transmit signals for the antenna structures that pass through electrical components such as switches. Harmonics of the transmitted signals may be generated as the signals pass through the electrical components. To reduce interference that might otherwise adversely affect sensitive receiver circuitry in the electronic device, adjustable filter circuitry may be interposed between the electrical components and the antenna structures. Control signals may adjust the adjustable circuitry in real time during operation of an electronic device to ensure that transmitted signals can pass through the adjustable filter circuitry while blocking the harmonic signals.

20 Claims, 9 Drawing Sheets

| SCENARIO | AGRESSOR | VICTIM | INTERFERING ELEMENT |
|---|---|---|---|
| A | CDMA BC 10 (817-823 MHz) | WiFi 2.4 GHz | 3rd HARMONIC OF CDMA BC 10 |
| B | WCDMA FDD2 (1900 MHz) | WiFi 5 GHz | 3rd HARMONIC OF WCDMA |
| C | LTE BAND 13 (782 MHz) | GPS (1574 MHz) | 2nd HARMONIC OF LTE BAND 13 |
| D | LTE BAND 38 2.6-2.7 GHz | WiFi 5 GHz | 2nd HARMONIC OF LTE BAND 38 |

FIG. 9

| | C1 | C2 | C3 | C4 | C5 |
|---|---|---|---|---|---|
| CELLULAR TX AND RX FREQ. RANGE (GHz) | SIMULATED PASSBAND INSERTION LOSS ($S_{21}$) | SIMULATED PASSBAND RETURN LOSS ($S_{11}$) | SIMULATED REJECTION AT GPS | SIMULATED REJECTION AT 2.4 GHz | SIMULATED REJECTION AT 5 GHz |
| R1 | f<1 | 0.3 dB | 13 dB | 13 dB | >30dB | >40dB |
| R2 | 1.7<f<2.2 | 0.2 dB | 20 dB | 0 | 0 | >35dB |
| R3 | 2.2<f<2.7 | 0.2 dB | 20 dB | 0 | 0 | >25dB |
| R4 | STATIC LPF | 0.4dB | 15 dB | 0 | 0 | 25dB |

FIG. 10

ELECTRONIC DEVICE HAVING ADAPTIVE FILTER CIRCUITRY FOR BLOCKING INTERFERENCE BETWEEN WIRELESS TRANSCEIVERS

BACKGROUND

This relates generally to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry.

To satisfy consumer demand for small form factor wireless devices, manufacturers are continually striving to implement wireless communications circuitry such as antenna components using compact structures. At the same time, it may be desirable to support multiple communications bands to support a variety of desired services. Switches may be incorporated into devices for supporting the use of multiple antennas.

Switches and other components can exhibit non-linear behaviors. When radio-frequency signals are transmitted through these components, signal harmonics can be produced. These harmonics can cause interference for sensitive receivers.

To reduce the impact of harmonic interference, static low pass filters are sometimes coupled to the output of a switch. The low pass filters can help filter out aggressors such as harmonics that are produced by the non-linear behavior of a switch before these aggressors cause interference for victims such as sensitive wireless receivers in other communications bands. This type of low pass filter arrangement may, however, be of little or no use in many operating scenarios. For example, a low pass filter will not be able to protect circuitry such as a wireless local area network receiver at 2.4 GHz from interference at 2.4 GHz without disrupting cellular telephone traffic at frequencies above 2.4 GHz.

SUMMARY

Electronic devices may include radio-frequency transceiver circuitry and antenna structures. The radio-frequency transceiver circuitry may transmit signals for the antenna structures that pass through electrical components such as switches. For example, the radio-frequency transceiver circuitry may transmit cellular telephone signals through switches. The switches may be antenna signal routing switches that are used in selecting antennas in an electronic device.

Harmonics of the transmitted signals may be generated as the signals pass through the electrical components. The harmonics may coincide with the communications frequencies being received by sensitive receiver circuitry. For example, a satellite navigation system receiver or a wireless local area network receiver might be vulnerable to interference from harmonics.

To reduce interference that might otherwise adversely affect the sensitive receiver circuitry in an electronic device, adjustable filter circuitry may be interposed between the electrical components and the antenna structures. The adjustable filter circuitry may be based on a pi network formed from series-connected inductors and adjustable capacitors that couple nodes between the inductors to ground. The adjustable capacitors may be placed in multiple different capacitor configurations each characterized by a distinct capacitance value.

During operation of an electronic device, control circuitry with knowledge of the currently transmitted signal band may produce control signals for the adjustable filter circuitry. The control signals may be used to place the adjustable circuitry in a configuration that allows the transmitted signals from the cellular telephone transmitter or other transmitter to pass while blocking interference such as harmonics from reaching sensitive circuitry such as satellite navigation system receiver circuitry and wireless local area network receiver circuitry.

Further features of the invention, its nature and various advantages will be more apparent from the accompanying drawings and the following detailed description of the preferred embodiments.

DETAILED DESCRIPTION

Figure 1:
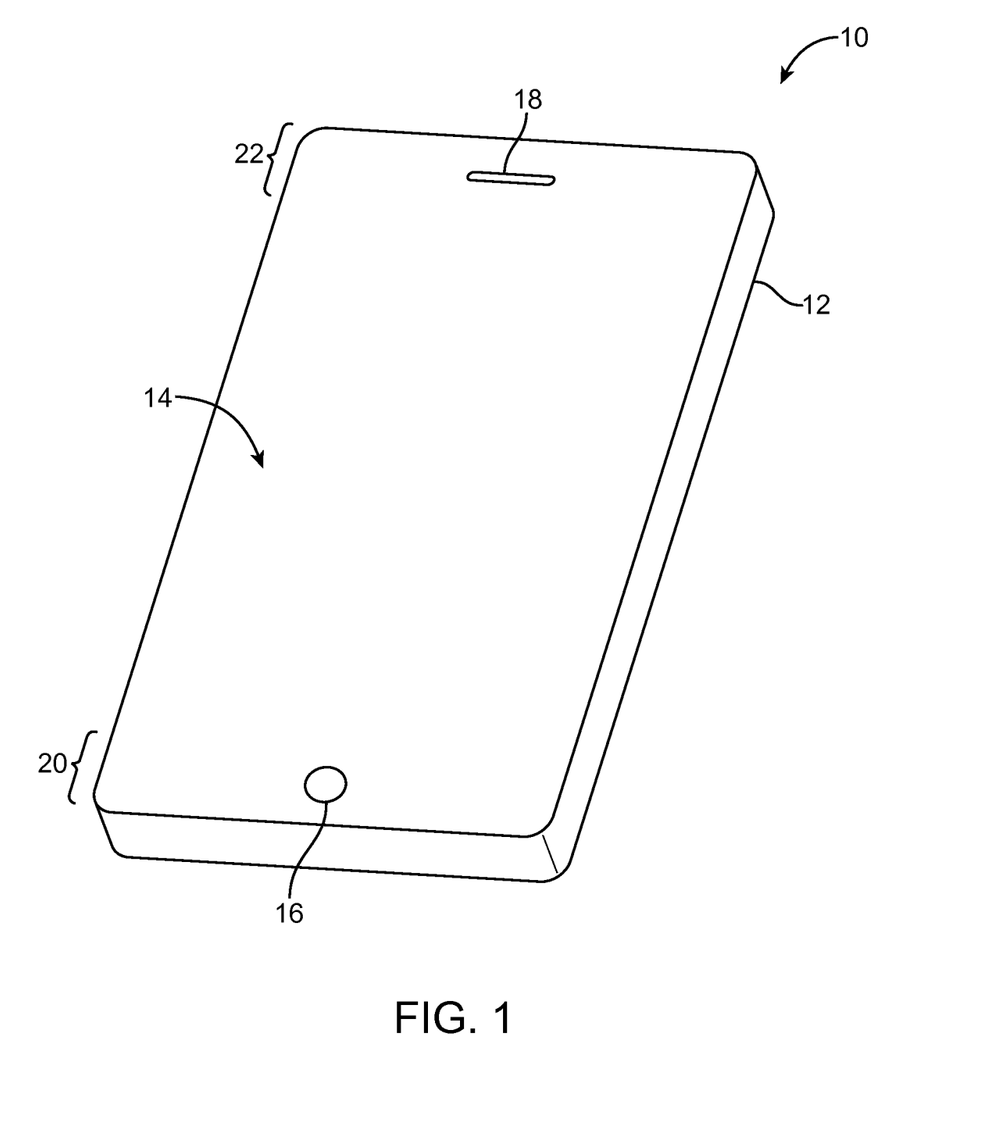
FIG. 1 is a perspective view of an illustrative electronic device with wireless communications circuitry in accordance with an embodiment of the present invention.

Electronic devices such as electronic device 10 of FIG. 1 may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include peripheral structures such as a peripheral conductive member that runs around the periphery of an electronic device. The peripheral conductive member may serve as a bezel for a planar structure such as a display, may serve as sidewall structures for a device housing, and/or may form other housing structures. Gaps in the peripheral conductive member may be associated with the antennas. Antennas may also be formed from metal traces on plastic carriers, metal traces on printed circuit substrates or other dielectric substrates, stamped metal foil, wires, and other conductive structures.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a layer of clear glass or plastic may cover the surface of display 14. Buttons such as button 16 may pass through openings in the cover layer. The cover layer may also have other openings such as an opening for speaker port 18.

Housing 12 may include peripheral conductive housing structures such as a metal bezel or band with a rectangular ring shape that runs around the periphery of housing 12. The peripheral conductive housing structures may form part of an antenna or antennas for device 10, if desired.

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures for device 10 as integral portions of the housing structures forming the rear surface of housing 12. For example, a rear housing wall of device 10 may be formed from a planar metal structure and portions of peripheral housing structures on the left and right sides of housing 12 may be formed as vertically extending integral metal portions of the planar metal structure. Housing structures such as these may, if desired, be machined from a block of metal.

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular sheet formed from one or more parts that is welded or otherwise connected between opposing sides of member 16), printed circuit boards, and other internal conductive structures. These conductive structures may be located in the center of housing 12 under display 14 (as an example).

In regions 22 and 20 or other portions of device 10, openings may be formed within the conductive structures of device 10 (e.g., between peripheral conductive housing structures and opposing conductive structures such as a conductive housing midplate or rear housing wall structures, a conductive ground plane associated with a printed circuit board, and conductive electrical components in device 10). These openings, which may sometimes be referred to as gaps, may be filled with air, plastic, and other dielectrics. Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations. The arrangement of FIG. 1 is merely an example.

In one illustrative configuration, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme. Switching circuitry may be used to switch the antennas in device 10 in and out of use. For example, switching circuitry in device 10 may be used to switch an upper antenna in region 22 in use in place of a lower antenna in region 20 when the performance of the lower antenna is temporarily degraded due to the presence of external objects near lower region 22 or other effects. Scenarios in which both antennas are being used simultaneously may also be supported.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
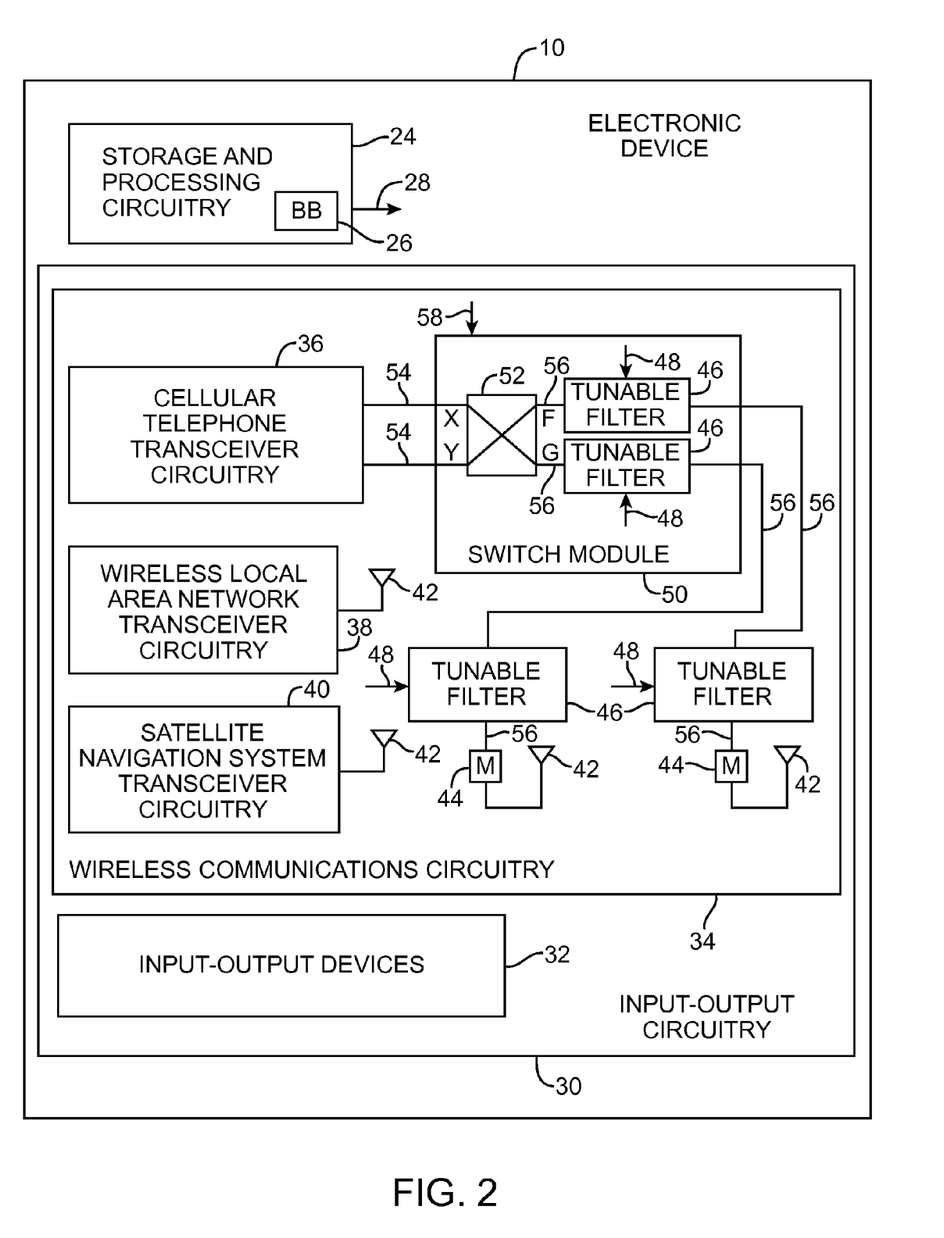
FIG. 2 is a schematic diagram of an illustrative electronic device with wireless communications circuitry in accordance with an embodiment of the present invention.

A schematic diagram of an illustrative configuration that may be used for electronic device 10 is shown in FIG. 2. As shown in FIG. 2, electronic device 10 may include control circuitry such as storage and processing circuitry 24. Storage and processing circuitry 24 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 24 may be used to control the operation of device 10. The processing circuitry may be based on one or more microprocessors, microcontrollers, digital signal processors, baseband processors such as baseband processor integrated circuit 26, power management units, audio codec chips, application specific integrated circuits, etc.

Storage and processing circuitry 24 may be used to run software on device 10, such as internet browsing applications, voice-over-internet-protocol (VOIP) telephone call applications, email applications, media playback applications, operating system functions, etc. To support interactions with external equipment, storage and processing circuitry 24 may be used in implementing communications protocols. Communications protocols that may be implemented using storage and processing circuitry 24 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 24 may be configured to implement control algorithms that control the use of antennas in device 10. For example, circuitry 24 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, or other adjustable circuits in device 10 to adjust antenna performance. As an example, circuitry 24 may control which of two or more antennas is being used to receive incoming radio-frequency signals, may control which of two or more antennas is being used to transmit radio-frequency signals, may control the process of routing incoming data streams over two or more antennas in device 10 in parallel, may place and adjustable filter in an appropriate configuration to help reduce interference while allowing device 10 to transmit and receive signals in one or more desired communications band, etc.

In performing these control operations, circuitry (e.g., baseband processor 26 or other control circuitry) may generate control commands on outputs such as output 28. The control signals that are produced by circuitry 24 may be applied to the control inputs of adjustable components in FIG. 2 (see, e.g., control input 58 of switch module 50 and control inputs 48 of adjustable filters 46). Circuitry 24 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, filters, duplexers, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 40 (e.g., for receiving satellite positioning signals at 1574 MHz) or satellite navigation system receiver circuitry associated with other satellite navigation systems. Wireless local area network transceiver circuitry such as transceiver circuitry 38 may handle 2.4 GHz and 5 GHz bands for WiFi® (IEEE 802.11) communications and may handle the 2.4 GHz Bluetooth® communications band. Circuitry 24 may use cellular telephone transceiver circuitry 36 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. Near field communications may also be supported (e.g., at 13.56 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may have antenna structures such as one or more antennas 42. Antennas structures 42 may be formed using any suitable antenna types. For example, antennas structures 42 may include antennas with resonating elements that are formed from loop antenna structures, patch antenna structures, inverted-F antenna structures, dual arm inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link. Antenna structures in device 10 such as one or more of antennas 42 may be provided with one or more antenna feeds, fixed and/or adjustable components, and optional parasitic antenna resonating elements so that the antenna structures cover desired communications bands.

Switching circuitry such as switch module 50 may be used in routing signals between radio-frequency transceiver circuitry in wireless communications circuitry 34 and antenna structures 42. In the illustrative configuration of FIG. 2, switch module 50 includes a switch such as switch 52 that has four ports (ports X, Y, F, and G). Transmission line paths 54 are coupled to two of the ports and transmission line paths 56 are couple to the other two of the ports. Switch 52 may be a crossbar switch that has a first configuration in which switch 52 routes paths 54 to paths 56 so that port X is coupled to port F and so that port Y is coupled to port G and a second configuration in which switch 52 routes paths 54 to paths 56 so that port X is coupled to port G and so that port Y is coupled to port F. Paths 56 may be coupled to different respective antennas 42, as shown in FIG. 2. Control circuitry 24 can control the state of cross-bar switch 52 in switch module 50 to switch a primary antenna into use (i.e., when the switch is in a first state) or to switch a secondary antenna into use when a primary antenna has been blocked (i.e., when the switch is in a second state). Switches with additional settings, switches that are coupled to different feeds of an antenna rather than being coupled to different antennas, switches that are coupled to three or more feeds and/or three or more separate antennas, or other types of switching circuitry may be used in device 10 if desired. The example of FIG. 2 in which a pair of antennas is coupled to transceiver circuitry 36 via switch module 50 is merely illustrative.

Switching circuitry such as switch module 50 may be used in routing signals associated with wireless local area network transceiver circuitry 38, satellite navigation system transceiver circuitry 40, and/or other wireless circuitry.

Wireless communications circuitry 34 may include impedance matching circuitry such as illustrative impedance matching circuitry 44 of FIG. 2. Impedance matching circuitry may be used to help match the impedance between transmission lines 56 and antennas 42. Each transmission line may include one or more transmission line segments (e.g., segments of coaxial cable transmission line, microstrip transmission line, etc.). Matching circuits 44 may be coupled within transmission line structures 56.

Adjustable filters 46 may be implemented using surface acoustic wave (SAW) devices, bulk acoustic wave (BAW) devices, and/or circuits formed from discrete components such as resistors (e.g., tunable and/or fixed resistors), inductors (e.g., tunable and/or fixed inductors), and capacitors (e.g., tunable and/or fixed capacitors). With one illustrative configuration, which is sometimes described herein as an example, tunable filters 46 may be formed from networks of adjustable capacitors and fixed inductors. This is merely illustrative. Any suitable circuitry may be used in implementing adjustable filter circuitry 46 if desired.

Adjustable filter circuitry 46 may be formed as part of switch module 50 and/or as stand-alone filters that are interposed between switch module 50 and antennas 42. The presence of adjustable filters 46 may help reduce harmonics such as harmonics that may arise when transmitting radio-frequency signals from transceiver circuitry 36 that pass through potentially non-linear electrical components such as switch module 50 (i.e., crossbar switch 52, which may be formed from transistors or other solid state components). Adjustable filters 46 may be adjusted by storage and processing circuitry 24. For example, control circuitry 24 can issue control commands on output 28 that are supplied to adjustable filters 46 at inputs 48. Adjustable filters 46 may form filters such as low pass filters with adjustable cutoff frequencies. Control circuitry 24 may adjust the cutoff frequencies of tunable filters 46 in real time depending on the frequencies of the signals being handled by cellular telephone transceiver circuitry 36. Control circuitry 24 may, for example, adjust the adjustable filter circuitry to allow signals such as transmitted cellular telephone signals to pass through the adjustable filter circuitry while blocking interfering harmonics.

Figure 3:
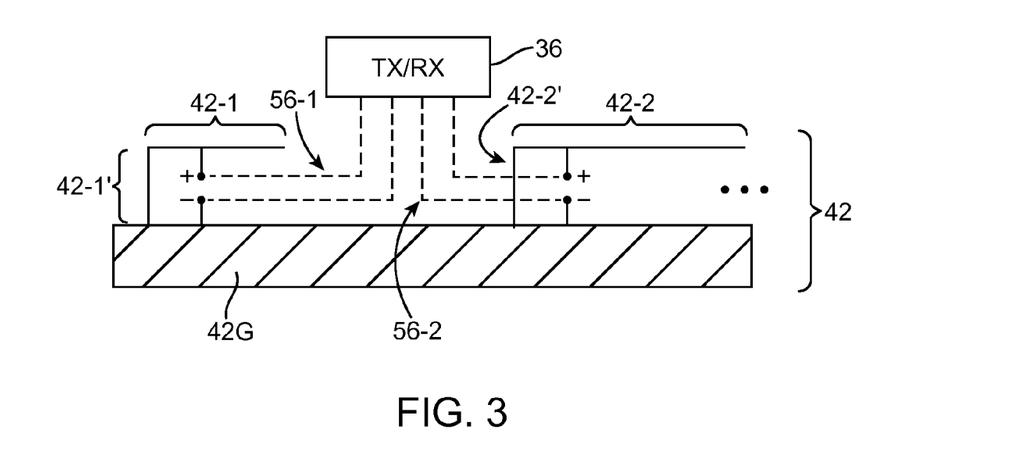
FIG. 3 is a diagram of an illustrative antenna system having multiple antenna resonating elements in accordance with an embodiment of the present invention.

Antenna structures 42 such as the antenna structures that are coupled to the pair of transmission line paths 56 at the output of switch module 50 of FIG. 2 may be formed from separate respective antenna resonating elements forming respective first and second antennas or may be formed from an antenna resonating element that has multiple ports. Consider, as an example, antenna structures 42 of FIG. 3. In this type of arrangement, antenna structures 42 include two antennas 42-1 and 42-2. Antenna 42-1 is formed from antenna resonating element 42-1' and shared antenna ground 42G. Antenna 42-1 may be an inverted-F antenna resonating element having an antenna feed with positive (+) and ground (−) antenna feed terminals) coupled to respective positive and ground lines in transmission line path 56-1. Antenna 42-2 is formed from antenna resonating element 42-2' and antenna ground 42G. Antenna resonating element 42-2' may be an inverted-F antenna resonating element having a feed with positive (+) and ground (−) antenna feed terminals) coupled to respective positive and ground lines in transmission line path 56-2. Transmission line paths 56-1 and 56-2 may be used to couple the antenna feeds from antennas 42-1 and 42-2 to transceiver circuitry 36. Additional antenna resonating elements may be coupled to transceiver circuitry 36 by additional transmission line paths, if desired. Switching circuitry such as switch module 50, matching circuitry such as matching circuitry 44 of FIG. 2, and adjustable filter circuitry 46 may be interposed in the transmission line paths, as described in connection with FIG. 2.

Figure 4:
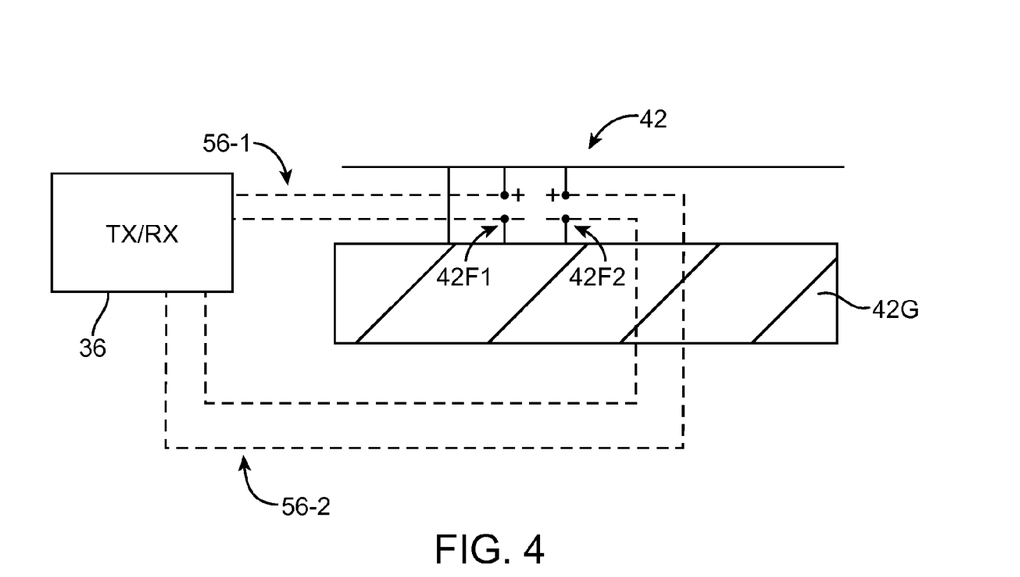
FIG. 4 is a diagram of an illustrative antenna system based on an antenna resonating element with multiple feeds in accordance with an embodiment of the present invention.

In the illustrative configuration of FIG. 4, antenna structures 42 include a two-arm inverted-F antenna resonating element having two antenna feeds. Antenna ground 42G and the antenna resonating element form a two-feed antenna. Feed 42F1 is coupled to transceiver 36 by transmission line 56-1. Feed 42F2 is coupled to transceiver 36 by transmission line 56-2. Additional antenna feeds may be incorporated into a multi-feed antenna of the type shown in FIG. 4 if desired. Antenna structures 42 may also be formed that include a combination of separate antenna resonating elements of the type shown in FIG. 3 and one or more antennas with multiple ports of the type shown in FIG. 4.

Figure 5:
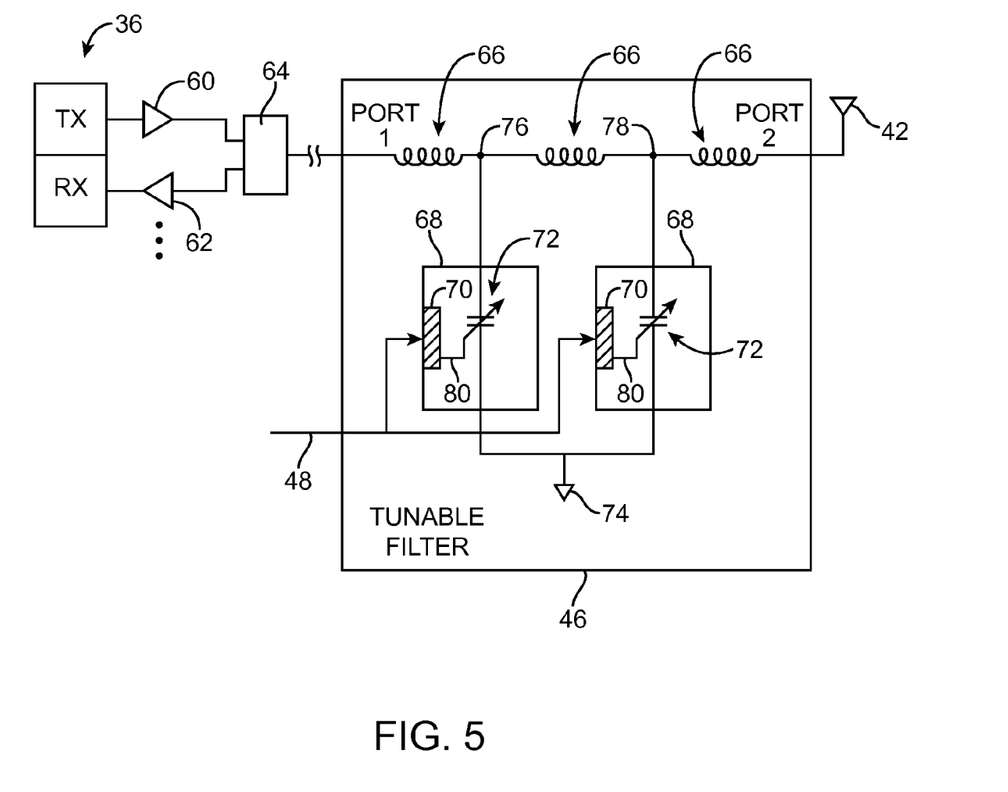
FIG. 5 is a diagram of wireless circuitry with adjustable filter circuitry for reducing harmonic interference in accordance with an embodiment of the present invention.

FIG. 5 is a circuit diagram of an illustrative adjustable filter 46 coupled between a radio-frequency transceiver (transceiver 36 with transmitter TX and receiver RX) and antenna 42 (switch module 50, additional antennas, and additional transceivers for other communications bands are not shown in FIG. 5 to avoid over-complicating the drawing).

As shown in FIG. 5, output signals from transmitter TX may be amplified by power amplifier 60. Incoming signals that are being received by receiver RX may be amplified by low noise amplifier 62. Duplexer 64 may route signals based on frequency and may be coupled between tunable filter 46 and amplifiers 60 and 62.

Adjustable filter 46 may include components such as inductors, capacitors, and other electrical devices. Adjustable filter 46 may have two ports (port 1 and port 2). The inductors, capacitors, and other electrical devices of adjustable filter 46 may be coupled between ports 1 and 2.

As shown in the example of FIG. 5, a set of three inductors 66 may be coupled in series between duplexer 64 and antenna 42. Adjustable capacitors 68 may be coupled between ground 74 and nodes 74 and 76, respectively. This type of filter topology may sometimes be referred to as a pi network. Filter 46 may, in general, be a T-network (i.e., a network with three poles), a pi network (i.e., a network with five poles), a three pole network, a four pole network, a five pole network, a network with more than five poles, etc. The configuration of FIG. 5 is merely illustrative.

Capacitors 68 may be programmable capacitors that each include a variable capacitor 72 controlled by a respective circuit block 70. Circuit blocks 70 may include communications circuitry for receiving control commands provided by control circuitry 24 over input path 48. As an example, each circuit block 70 may have a communications circuit that receives a capacitor setting command from path 48 and that issues corresponding control signals on paths 80 to variable capacitors 72. Variable capacitors 72 may be configured to exhibit continuously variable or selectable discrete capacitor values. As an example, variable capacitors 72 may have multiplexers or other switches that are controlled based on signals on paths 80. The switches may be used to switch a desired discrete capacitor into use.

With one illustrative configuration, the leftmost inductor 66 in tunable filter 46 has an inductance value of 5 nH, the center inductor 66 in tunable filter 46 has an inductance value of 10 nH, and the rightmost inductor 66 in tunable filter 46 has an inductance value of 5 nH. Capacitors 68 may each have three selectable capacitance values such as a first capacitance of 5 pF, a second capacitance of 1.5 pF, and a third capacitance of 1.0 pF (as examples). Other component values may be used in filter circuitry 46 if desired. This illustrative configuration is merely an example.

Capacitors 68 may be configured dynamically based on signals from control circuitry 24. In a first state, capacitors 68 may be adjusted to exhibit a capacitance of 5 pF each. In a second state, capacitors 68 may be adjusted to exhibit a capacitance of 1.5 pF each. In a third state, capacitors 68 may be adjusted to exhibit a capacitance of 1.0 pF each. The cutoff frequency of filter 46 may vary as a function of the values of capacitors 68. For example, when capacitors 68 are configured to exhibit a 5 pF capacitance, filter 46 may exhibit S11 (return loss) and S21 (insertion loss) characteristics of the type shown in FIG. 6 (i.e., the cutoff frequency for the filter may be about 1.25 GHz). When capacitors 68 are configured to exhibit a 1.5 pF capacitance, filter 46 may exhibit S11 and S21 characteristics of the type shown in FIG. 7 (i.e., the cutoff frequency for filter 46 may be about 2.5 GHz). When capacitors 68 are configured to exhibit a 1.0 pF capacitance, filter 46 may exhibit S11 and S21 characteristics of the type shown in FIG. 8 (i.e., the cutoff frequency for filter 46 may be about 3.2 GHz). Each of these different settings for adjustable filter circuitry 46 may be used under different operating conditions for wireless circuitry 34, so that harmonics can be adequately suppressed, while allowing communications signals to pass through filter 46 without excessive attenuation.

Figure 6:
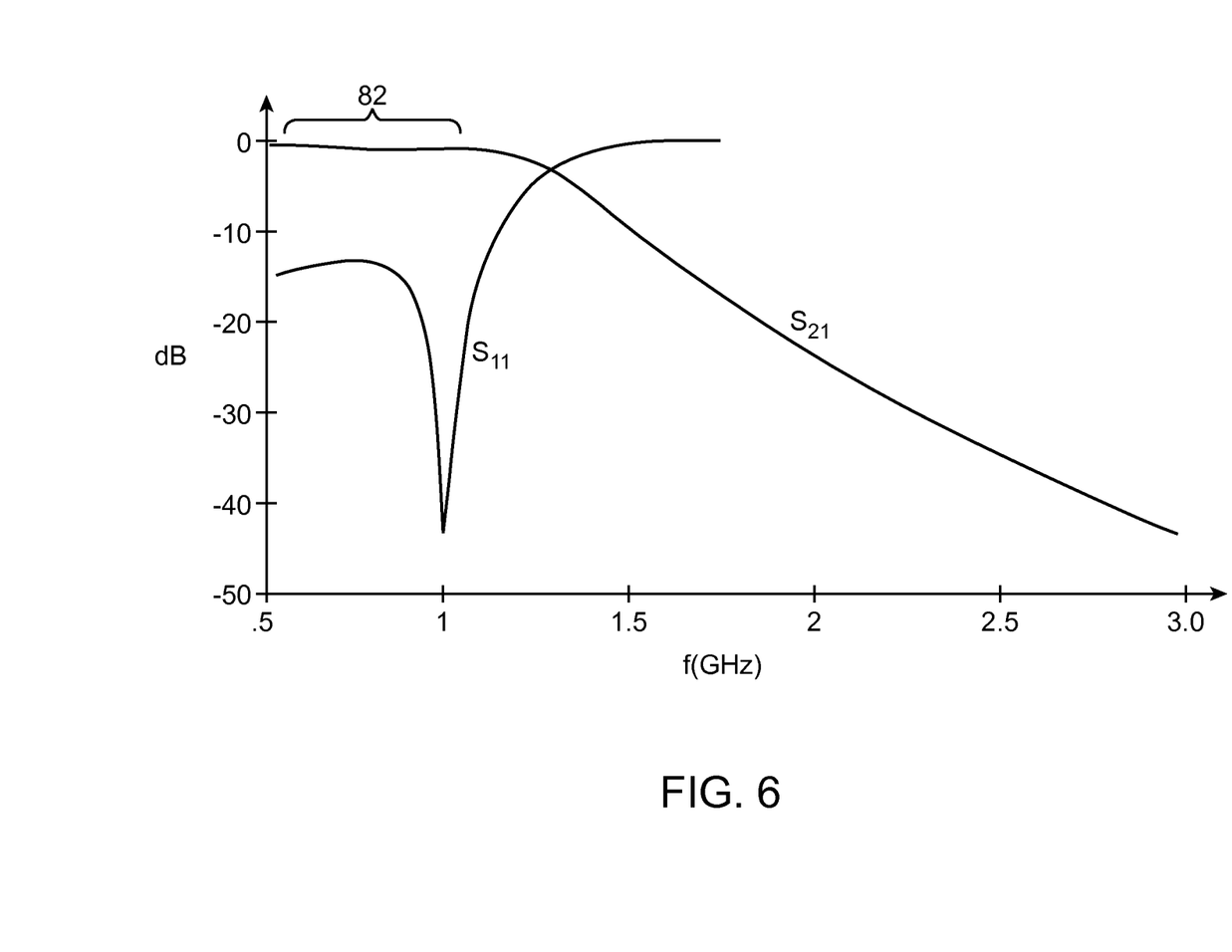
FIG. 6 is a graph showing simulated filter performance when an adjustable filter of the type shown in FIG. 5 has been placed in a first configuration with a relatively low cutoff frequency in accordance with an embodiment of the present invention.

When filter circuitry 46 is placed in the FIG. 6 configuration, cellular telephone signals in the range of 0.7 to 1 GHz will be passed through filter circuitry 46 without significant attenuation, as indicated by portion 82 of the S21 curve in FIG. 6. (Note that there are generally no cellular telephone bands at frequencies of about 1-1.7 GHz). Harmonics of the cellular telephone aggressors that fall above about 1.25 GHz will be suppressed due to the presence of filter circuitry 46 (i.e., interference for victims such as a GPS receiver at 1.574 GHz and wireless local area network bands at 2.4 GHz and 5 GHz will be blocked).

Figure 9:
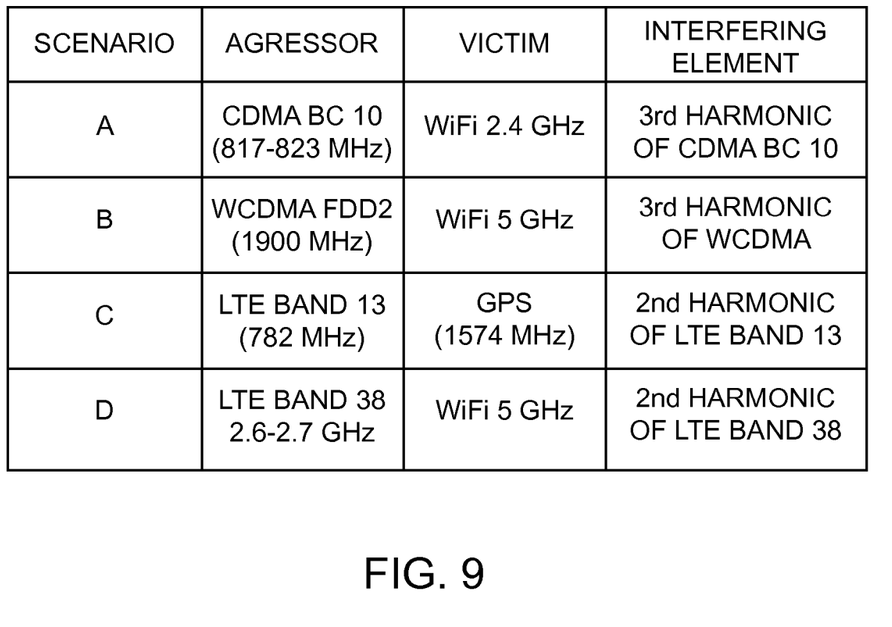
FIG. 9 is a table in which aggressor and victim frequencies have been listed for a variety of possible operating scenarios in an electronic device in accordance with an embodiment of the present invention.

Consider, as an example, scenario A of FIG. 9. In this type of scenario, a cellular telephone signal such as CDMA (code division multiple access) band class 10 at 817 to 823 MHz is being transmitted by transmitter TX. Filter circuitry 46 can be placed in the FIG. 6 configuration to prevent the third harmonic of this cellular telephone frequency from creating interference for a wireless local area network receiver operating at 2.4 GHz. As another example, consider scenario C of FIG. 9. In this type of scenario, a cellular telephone signal such as Long Term Evolution (LTE) band 13 at 782 MHz is being transmitted by transmitter TX, so filter 46 can be placed in the FIG. 6 configuration to prevent the second harmonic of LTE band 13 from creating interference for Global Positioning System (GPS) or other satellite navigation system receiver operating at about 1.574 GHz.

Figure 7:
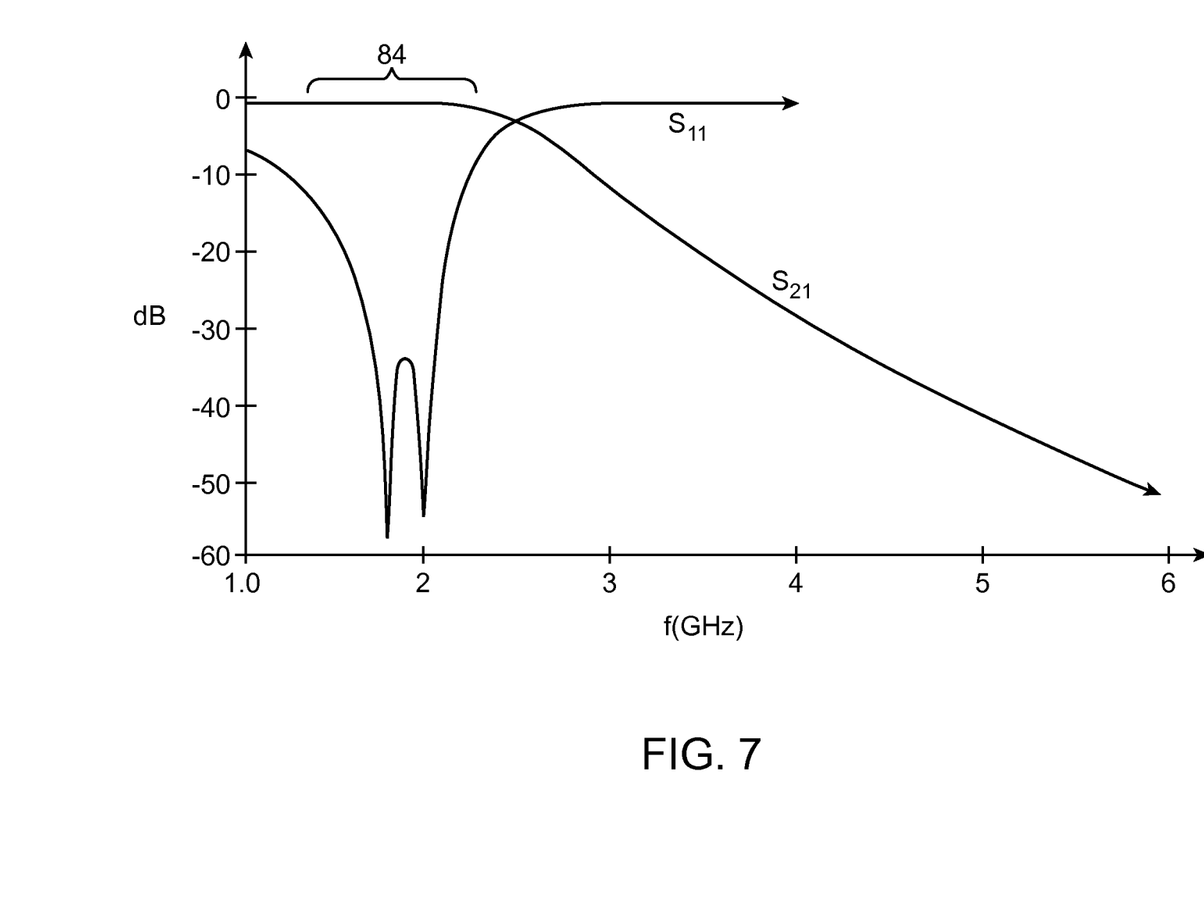
FIG. 7 is a graph showing simulated filter performance when an adjustable filter of the type shown in FIG. 5 has been placed in a second configuration having a cutoff frequency that is greater than the cutoff frequency of FIG. 6 in accordance with an embodiment of the present invention.

When filter circuitry 46 is placed in the FIG. 7 configuration, cellular telephone signals in the range of 1.7 to 2.2 GHz will be passed through filter circuitry 46 without significant attenuation (i.e., with minimum insertion loss), as indicated by portion 84 of the S21 curve in FIG. 7. Harmonics of these cellular telephone aggressors that fall above 2.5 GHz will be blocked (i.e., interference for a victim such as a wireless local area network band at 5 GHz will be suppressed) due to the presence of filter circuitry 46.

Consider, as an example, scenario B of FIG. 9. In this type of scenario, a cellular telephone signal in a communications band at 1900 MHz such as wideband code division multiple access frequency division duplex 2 (WCDMA FDD2) is being transmitted by transmitter TX, so filter 46 can be placed in the FIG. 7 configuration to prevent the third harmonic of this cellular telephone frequency from creating interference for a wireless local area network receiver operating at 5 GHz.

Figure 8:
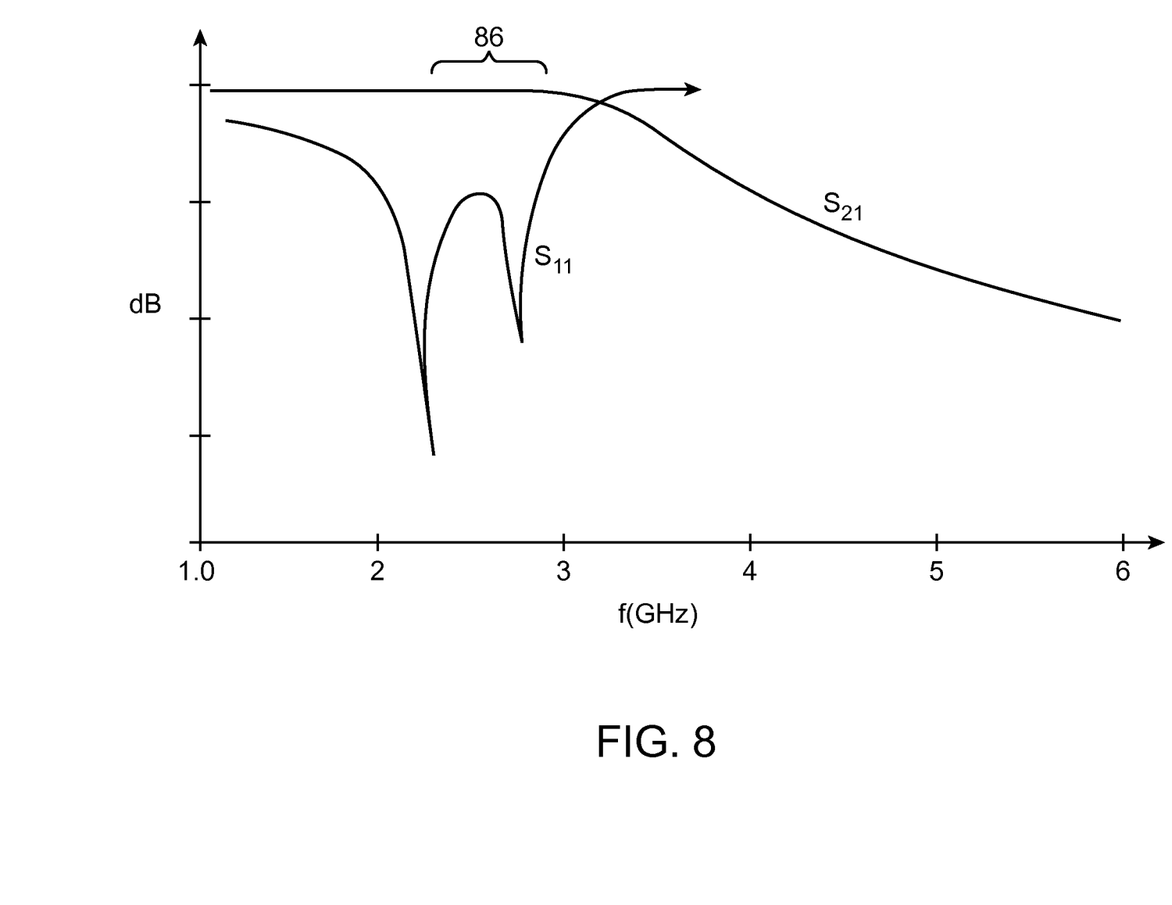
FIG. 8 is a graph showing simulated filter performance when an adjustable filter of the type shown in FIG. 5 has been placed in a third configuration having a cutoff frequency that is greater than the cutoff frequency of FIG. 7 in accordance with an embodiment of the present invention.

When filter circuitry 46 is placed in the FIG. 8 configuration, cellular telephone signals in the range of 2.2 to 2.7 GHz will be passed through filter circuitry 46 without significant attenuation (i.e., with minimum insertion loss), as indicated by portion 86 of the S21 curve in FIG. 8. Harmonics of these cellular telephone aggressors that fall above 3.2 GHz will be blocked (i.e., interference for a victim such as a wireless local area network band at 5 GHz will be suppressed) due to the presence of filter circuitry 46.

Consider, as an example, scenario D of FIG. 9. In this type of scenario, a cellular telephone signal in a communications band at 2.6 to 2.7 GHz such as Long Term Evolution (LTE) band 38 is being transmitted by transmitter TX, so filter 46 can be placed in the FIG. 8 configuration to prevent the second harmonic of this cellular telephone frequency from creating interference for a wireless local area network receiver operating at 5 GHz. As the scenario D example illustrates, harmonic interference can be blocked by adjustable filter circuitry 46 while allowing signals at relatively high cellular telephone signal frequencies to be transmitted. When lower frequency harmonics are to be blocked, the adjustable filter circuitry can be reconfigured accordingly.

Figure 10:
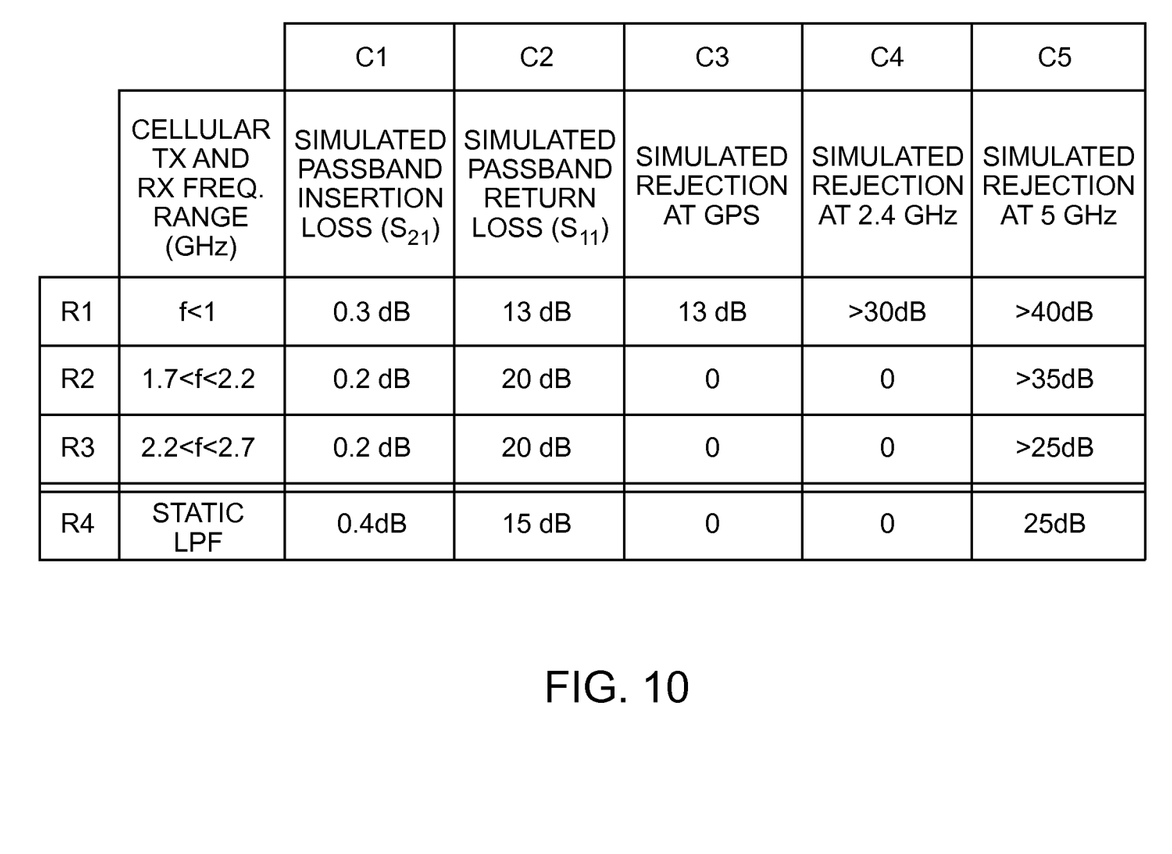
FIG. 10 is a table in which simulated insertion loss and rejection values have been computed for an adjustable filter of the type shown in FIG. 5 when operated in scenarios of the type shown in FIG. 9 in accordance with an embodiment of the present invention.

The table of FIG. 10 shows simulation results for the use of filter circuitry 46 (e.g., an adjustable low pass filter) under a variety of operating scenarios compared to a static low pass filter (LPF). The performance of filter circuitry 46 at frequencies of less than 1 GHz is shown in row R1. The performance of filter circuitry 46 at frequencies of 1.7 to 2.2 GHz is shown in row R2. The performance of filter circuitry 46 at frequencies of 2.2 to 2.7 GHz is shown in row R3. For comparison, the simulated performance of a static low pass filter (i.e., a static low pass filter interposed between a switch module and antenna structures) is provided in row R4.

As shown by the entries in column C1 of the table of FIG. 10, the expected passband insertion loss (S21) due to filter 46 is comparable to the expected passband insertion loss of the static low pass filter.

As shown by the entries in column C2 of the table of FIG. 10, the passband return loss (S11) is relatively high (as desired) and is comparable to the return loss for the static low pass filter.

The entries at row R1, column C3 and at row R1, column C4 correspond to filter 46 in the FIG. 6 configuration when operating wireless circuitry 34 in scenario C and show how interference at the GPS receiver is reduced by 13 dB while interference at a wireless local area network receiver at 2.4 GHz is reduced by more than 30 dB.

The entries in columns C3 and C4 of rows R2 and R3 correspond to a situation in which the GPS and 2.4 GHz receivers are not receiving harmonic interference (i.e., rejection performance is the same as for the static low pass filter, as shown in row R4, columns C3 and C4).

Column C5 contains entries in which 5 GHz rejection is compared between filter 46 (rows R1, R2, and R3) with a static low pass filter (row R4). Row R1, column C5 shows how filter 46 exhibits a rejection of more than 40 dB when placed in the FIG. 6 configuration. Row R2, column C5 shows how filter 46 exhibits a rejection of more than 35 dB when placed in the FIG. 7 configuration. Row R3, column C5 shows how filter 46 exhibits a rejection of more than 25 dB when placed in the FIG. 8 configuration. These performance metrics equal or exceed the simulated performance of the static low pass filter (25 dB, as shown in row R4, column C5).

The foregoing is merely illustrative of the principles of this invention and various modifications can be made by those skilled in the art without departing from the scope and spirit of the invention.

What is claimed is:

1. An electronic device, comprising:
control circuitry;
antenna structures comprising first and second antennas;
an electrical component comprising a switch having first, second, third, and fourth ports;
radio-frequency transceiver circuitry that is coupled to the antenna structures through the electrical component, wherein the radio-frequency transceiver circuitry includes a transmitter that transmits radio-frequency signals and a receiver; and
adjustable filter circuitry interposed between the electrical component and the antenna structures, wherein the first and second ports are coupled to the radio-frequency transceiver circuitry, the third port is coupled to the first antenna through a first portion of the adjustable filter circuitry, the fourth port is coupled to the second antenna through a second portion of the adjustable filter circuitry, and the adjustable filter circuitry is configured by the control circuitry to allow the radio-frequency signals from the transmitter to pass to the antenna structures while blocking interference from harmonics that are produced while the radio-frequency signals from the transmitter circuitry pass through the electrical component.

2. The electronic device defined in claim 1 adjusted by additional control signals from the control circuitry.

3. The electronic device defined in claim 1 wherein the radio-frequency transceiver circuitry includes a cellular telephone transceiver in which the transmitter is formed and includes a wireless local area network receiver, wherein the adjustable filter circuitry is configured to allow radio-frequency signals from the transmitter in the cellular telephone transceiver to pass and is configured to prevent the harmonics from reaching the wireless local area network receiver.

4. The electronic device defined in claim 3 wherein the first antenna is configured to transmit the radio-frequency signals from the transmitter in the cellular telephone transceiver.

5. The electronic device defined in claim 4 wherein the second antenna is configured to receive wireless local area network signals for the wireless local area network receiver.

6. The electronic device defined in claim 1, wherein the transmitter is configured to transmit the radio-frequency signals at a frequency of 817 MHz to 823 MHz, the receiver is configured to receive radio-frequency signals in a 2.4 GHz communications band, and the control circuitry configures the adjustable filter circuitry to prevent a third harmonic of the signals at the frequency of 817 MHz to 823 MHz from interfering with reception of the radio-frequency signals in the 2.4 GHz communications band by the receiver.

7. The electronic device defined in claim 1, wherein the transmitter is configured to transmit the radio-frequency signals at a frequency of 1900 MHz, the receiver is configured to receive radio-frequency signals in a 5 GHz communications band, and the control circuitry configures the adjustable filter circuitry to prevent a third harmonic of the signals at the frequency of 1900 MHz from interfering with reception of the radio-frequency signals in the 5 GHz communications band by the receiver.

8. The electronic device defined in claim 1, wherein the transmitter is configured to transmit the radio-frequency signals at a frequency of 782 MHz, the receiver is configured to receive radio-frequency signals in a Global Positioning System communications band at 1574 MHz, and the control circuitry configures the adjustable filter circuitry to prevent a second harmonic of the signals at the frequency of 782 MHz from interfering with reception of the radio-frequency signals in the Global Positioning System communications band by the receiver.

9. The electronic device defined in claim 1, wherein the transmitter is configured to transmit the radio-frequency signals at a frequency of 2.6 to 2.7 GHz, the receiver is configured to receive radio-frequency signals in a 5 GHz communications band, and the control circuitry configures the adjustable filter circuitry to prevent a second harmonic of the signals at the frequency of 2.6 to 2.7 GHz from interfering with reception of the radio-frequency signals in the 5 GHz communications band by the receiver.

10. The electronic device defined in claim 1, wherein the adjustable filter circuitry has fifth and sixth ports, a plurality of inductors coupled in series between the first and second ports, and a plurality of adjustable capacitors controlled by control signals from the control circuitry.

11. The electronic device defined in claim 10 wherein the plurality of adjustable capacitors each has an input that receives the control signals from the control circuitry.

12. The electronic device defined in claim 10 wherein the inductors and capacitors are configured to form a pi network.

13. The electronic device defined in claim 1, wherein the switch comprises a cross bar switch.

14. An electronic device, comprising:
a cellular telephone transmitter that transmits signals;
a receiver;
antenna structures comprising first and second antennas that are coupled to the cellular telephone transmitter and the receiver, wherein the cellular telephone transmitter and the receiver are formed within a radio-frequency transceiver;
a switch through which the transmitted signals pass, wherein harmonics of the transmitted signals are generated when the transmitted signals pass through the switch; and
adjustable low pass filter circuitry between the switch and the antenna structures, wherein the adjustable low pass filter circuitry is configured to allow the transmitted signals to pass from the switch to the antenna structures and is configured to block the harmonics to prevent the harmonics from interfering with the receiver, the switch has first, second, third, and fourth ports, the first and second ports are coupled to the radio-frequency transceiver, the third port is coupled to the first antenna through a first portion of the adjustable low pass filter circuitry, and the fourth port is coupled to the second antenna through a second portion of the adjustable low pass filter circuitry.

15. The electronic device defined in claim 14 wherein the adjustable low pass filter circuitry and the switch form portions of a switch module, the electronic device further comprising control circuitry that supplies control signals to the switch and to the adjustable low pass filter circuitry.

16. The electronic device defined in claim 14 wherein the adjustable low pass filter circuitry includes a plurality of inductors and a plurality of adjustable capacitors.

17. The electronic device defined in claim 14 wherein the receiver comprises a wireless local area network receiver and wherein the transmitter is configured to transmit signals at 2.6 to 2.7 GHz while the adjustable low pass filter circuitry is configured to block the harmonics of the signals at 2.6 to 2.7 GHz.

18. The electronic device defined in claim 14, wherein the switch comprises a cross bar switch.

19. The electronic device defined in claim 18, further comprising control circuitry, wherein the control circuitry is configured to place the cross bar switch in a first configuration in which the first port is coupled to the third port and the second port is coupled to the fourth port, and the control circuitry is configured to place the cross bar switch in a second configuration in which the first port is coupled to the fourth port and the second port is coupled to the third port.

20. An electronic device, comprising:
control circuitry;
antenna structures;
an electrical component;
radio-frequency transceiver circuitry that is coupled to the antenna structures through the electrical component, wherein the radio-frequency transceiver circuitry includes a transmitter that transmits radio-frequency signals and a receiver; and
adjustable filter circuitry interposed between the electrical component and the antenna structures, wherein the adjustable filter circuitry comprises at least one adjustable capacitor circuit, the electrical component comprises a switch having a plurality of ports coupled to the radio-frequency transceiver circuitry, the antenna structures comprise first and second antennas, and the switch comprises a first port coupled to the first antenna through a first portion of the adjustable filter circuitry and a second port coupled to the second antenna through a second portion of the adjustable filter circuitry.

\* \* \* \* \*